US012723960B2

(12) United States Patent
Shao et al.

(10) Patent No.: US 12,723,960 B2

(45) Date of Patent: Sep. 1, 2026

(54) METHOD AND SMART GAS INTERNET OF THINGS (IOT) SYSTEM FOR DETERMINING GAS METERING STRATEGIES

(71) Applicant: CHENGDU QINCHUAN IOT TECHNOLOGY CO., LTD., Chengdu (CN)

(72) Inventors: Zehua Shao, Chengdu (CN); Yong Li, Chengdu (CN); Bin Liu, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 345 days.

(21) Appl. No.: 18/650,043

(22) Filed: Apr. 29, 2024

(65) Prior Publication Data

US 2024/0280454 A1 Aug. 22, 2024

Related U.S. Application Data

(63) Continuation of application No. 18/487,108, filed on Oct. 15, 2023, now Pat. No. 12,044,604.

(30) Foreign Application Priority Data

Jul. 19, 2023 (CN) ......................... 202310885030.4

(51) Int. Cl.
*G01N 11/00* (2006.01)

(52) U.S. Cl.
CPC ...... *G01N 11/00* (2013.01); *G01N 2011/0073* (2013.01)

(58) Field of Classification Search
CPC ........... G01N 11/00; G01N 2011/0073; G01N 29/30; G01N 2291/021; G01N 2291/02836; G01F 1/662; G01F 25/10; G01F 15/063; G01F 1/667; G06F 18/214; G06F 18/241; G06F 2218/22; G16Y 10/35; G16Y 20/30;
(Continued)

(56) References Cited

U.S. PATENT DOCUMENTS

2005/0055171 A1 3/2005 Freund et al.
2010/0218618 A1* 9/2010 Mori ....................... G01F 1/663 73/861.28
2010/0329320 A1 12/2010 Umehara et al.
(Continued)

*Primary Examiner* — Tarun Sinha
(74) *Attorney, Agent, or Firm* — METIS IP LLC

(57) ABSTRACT

A method and a smart gas Internet of Things (IoT) system for determining a gas metering strategy are provided. The method includes: determining, based on time-dividing point correlation data, at least one group of candidate time-dividing points; determining, based on an assessment mode, an assessment result of the at least one group of candidate time-dividing points; determining, based on the assessment result, the at least two time-dividing points, wherein the at least two time-dividing points form at least one group of time-dividing point groups; transmitting at least two sound waves of different frequencies at the at least two time-dividing points and receiving at least two echo signals; determining, based on the at least two echo signals, a gas flow difference; determining, based on the gas flow difference, whether a noise interference exists; and in response to a determination that the noise interference exists, adjusting the gas metering strategy.

17 Claims, 6 Drawing Sheets

(58) Field of Classification Search
CPC ........ G16Y 40/10; G16Y 40/35; G06N 3/044; G06N 3/08; G06N 20/00
See application file for complete search history.

(56) References Cited

U.S. PATENT DOCUMENTS

| | | | | |
|---|---|---|---|---|
| 2016/0116588 | A1 | 4/2016 | Fukuman et al. | |
| 2017/0146501 | A1* | 5/2017 | Martens | G01N 33/007 |
| 2019/0376823 | A1* | 12/2019 | Hokkanen | G01F 1/667 |
| 2024/0035869 | A1* | 2/2024 | Shamrock | G01F 15/068 |

* cited by examiner

METHOD AND SMART GAS INTERNET OF THINGS (IOT) SYSTEM FOR DETERMINING GAS METERING STRATEGIES

CROSS-REFERENCE TO RELATED APPLICATION

This application is a continuation of U.S. patent application Ser. No. 18/487,108, filed on Oct. 15, 2023, which claims priority of Chinese Patent Application No. 202310885030.4 filed on Jul. 19, 2023, the contents of which are entirely incorporated herein by reference.

TECHNICAL FIELD

The present disclosure relates to the field of gas flow metering, and in particular, to a method and a smart gas Internet of Things (IoT) system for determining a gas metering strategy.

BACKGROUND

With a continuous expansion of a gas market in China, an issue of gas metering has become increasingly important. A gas ultrasonic meter is a flow measurement instrument that provides a convenient metering. The gas ultrasonic meter is gradually applied to a flow metering in a gas pipeline, such as an air ultrasonic flowmeter and an ultrasonic gas meter. In practical applications, the gas ultrasonic meter may be susceptible to a noise interference, resulting in problems such as a low measurement accuracy and a poor stability of metering results.

Therefore, it is desirable to provide an improved method and a smart gas Internet of Things (IoT) system for determining a gas metering strategy, which reduces an influence of an external interference, improves the stability and reliability of the metering results, and enhances an effectiveness of the gas metering.

SUMMARY

One or more embodiments of the present disclosure provide a method for determining a gas metering strategy. The method may be executed by a smart gas device management platform of a smart gas Internet of Things (IoT) system for determining the gas metering strategy. The method may comprises: obtaining time-dividing point correlation data; determining, based on the time-dividing point correlation data, at least one group of candidate time-dividing points; determining, based on an assessment mode, an assessment result of the at least one group of candidate time-dividing points; determining, based on the assessment result, the at least two time-dividing points, wherein the at least two time-dividing points form at least one group of time-dividing point groups; transmitting at least two sound waves of different frequencies at the at least two time-dividing points and receiving at least two echo signals by the gas ultrasonic meter; determining, based on the at least two echo signals, a gas flow difference; determining, based on the gas flow difference, whether a noise interference exists; and in response to a determination that the noise interference exists, adjusting the gas metering strategy.

One or more embodiments of the present disclosure provide a smart gas Internet of Things (IoT) system for determining a metering strategy. The system may include a smart gas user platform, a smart gas service platform, a smart gas sensing network platform, a smart gas object platform, and a smart gas device management platform. The smart gas user platform may include a plurality of user sub-platforms. The smart gas service platform may include a plurality of service sub-platforms. The smart gas device management platform may include a plurality of device parameter management sub-platforms and a smart gas data center. The smart gas sensing network platform may be configured to interact with the smart gas data center and the smart gas object platform. The smart gas object platform may be configured to transmit sound waves and obtain echo signal based on a detection instruction, wherein the smart gas object platform includes a gas ultrasonic meter. The smart gas device management platform may be configured to: send the detection instruction to the smart gas object platform through the smart gas sensing network platform, transmit at least two sound waves of different frequencies at the at least two time-dividing points and receiving at least two echo signals by the gas ultrasonic meter; wherein the at least two time-dividing points form at least one group of time-dividing point groups; determining, based on an assessment result of at least one group of candidate time-dividing points, the at least two time-dividing points, wherein the assessment result is determined based on an assessment mode, and the at least one group of candidate time-dividing points is determined based on the time-dividing point correlation data obtained by the smart gas device management platform; and determine, based on the at least two echo signals, a gas flow difference; determine, based on the gas flow difference, whether a noise interference exists; and in response to a determination that the noise interference exists, adjust a gas metering strategy.

One or more embodiments of the present disclosure provide a non-transitory computer readable medium, comprising computer instructions that, when executed by a computer, directs the computer to perform the above method.

BRIEF DESCRIPTION OF THE DRAWINGS

The present disclosure will be further illustrated by way of exemplary embodiments, which will be described in detail with reference to the accompanying drawings. These embodiments are not limiting, and in these embodiments, the same numbering denotes the same structure, wherein.

DETAILED DESCRIPTION

Figure 1:
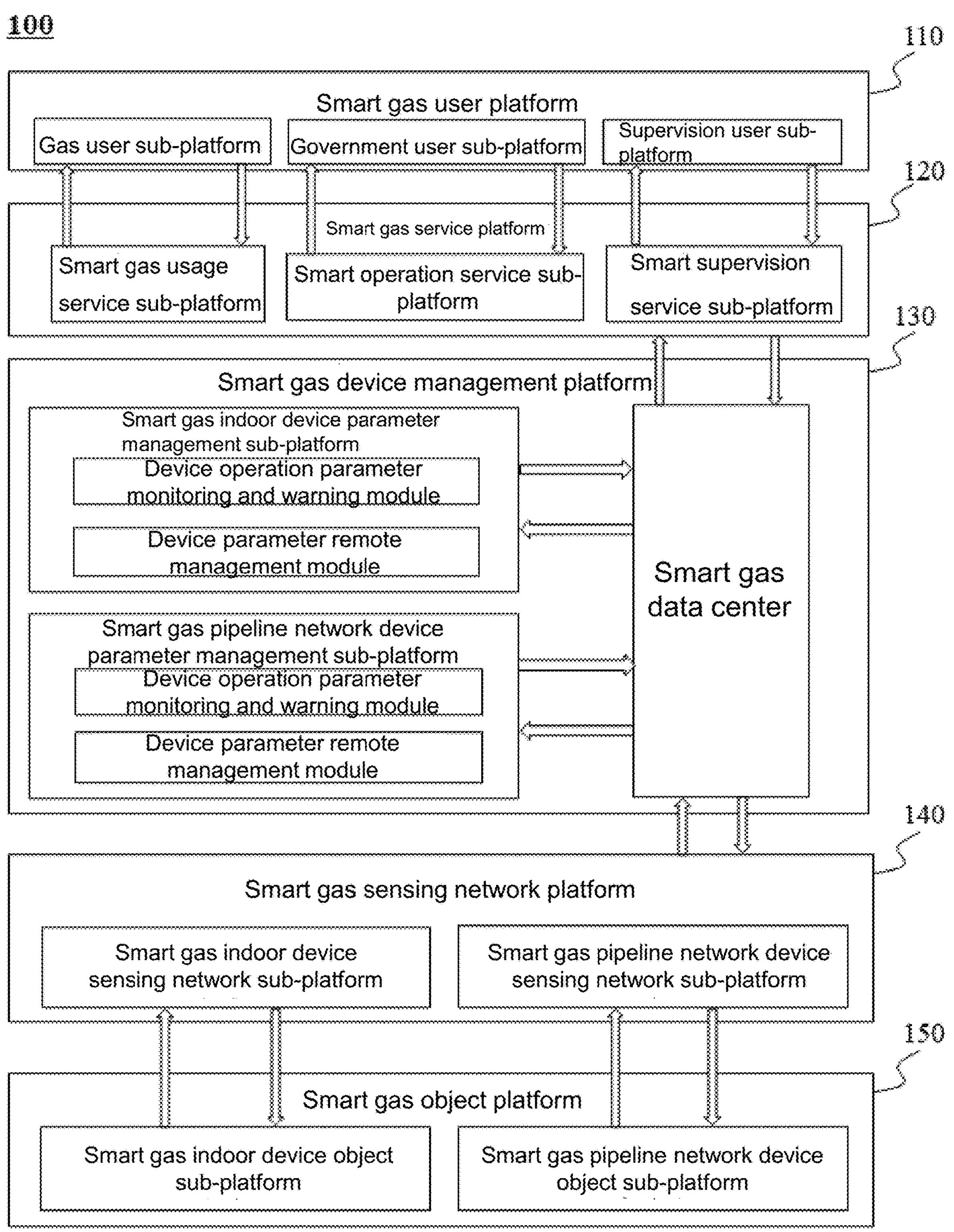
FIG. 1 is a schematic diagram illustrating a structure of a smart gas Internet of things (IoT) system for metering anti-interference of a gas ultrasonic meter according to some embodiments of the present disclosure.

In order to provide a clear explanation of the technical solutions of the embodiments of the present disclosure, a brief introduction of the accompanying drawings used in the description of the embodiments is presented below. It is evident that the accompanying drawings described below are merely examples or embodiments of the present disclosure. Those skilled in the art may apply the present disclosure to other similar situations without exercising inventive efforts based on these drawings. Unless it is obviously obtained from the context or otherwise stated, the same reference number in the drawings refers to the same structure or operation.

It should be understood that the terms "system" and/or "module" etc., as used herein, are used as a means of distinguishing between different levels of different parts or assemblies. It should be understood that the use of "system" and/or "module" etc. herein is a mode for distinguishing between different levels of parts or assemblies, and that other expressions may be used in place of the words.

As disclosed in the present disclosure and the claims, unless the context clearly suggests otherwise, the terms "one," "a," "a kind of," or "the" do not exclusively refer to the singular form and may include the plural form. Generally speaking, the terms "including" and "comprising" only indicate the inclusion of explicitly identified steps and elements. The method or apparatus may also include other steps or elements, and the list is not exclusive.

Flowcharts are used in the present disclosure to illustrate the operations performed by a system according to the embodiments described herein. It should be understood that the operations are not necessarily performed in a specific sequence. On the contrary, the operations may be processed in reverse order or simultaneously, and an operation or multiple operations may be added or removed.

FIG. 1 is a schematic diagram illustrating a structure of a smart gas Internet of things (IoT) system for metering anti-interference of a gas ultrasonic meter according to some embodiments of the present disclosure.

In some embodiments, a smart gas IoT system 100 (referred to as system 100) for metering anti-interference of the gas ultrasonic meter may include a smart gas user platform 110, a smart gas service platform 120, a smart gas device management platform 130, a smart gas sensing network platform 140, and a smart gas object platform 150.

The smart gas user platform 110 may be configured for user interaction and may include a terminal device.

In some embodiments, the smart gas user platform 110 may include a plurality of user sub-platforms, such as a gas user sub-platform, a supervision user sub-platform, and a government user sub-platform. The plurality of user sub-platforms may provide gas use-related data, a gas problem solution, a regulatory interface, a gas operation-related data, etc., for a gas user, a supervision user, and a government user, respectively.

The gas user may be an industrial gas user, a commercial gas user, an ordinary gas user, etc. The supervision user may be personnel in a safety management department. The government user may be a manager of a gas operation entity, such as an administrative department manager.

In some embodiments, the smart gas service platform 110 may send information, such as a detection instruction and a gas metering strategy adjustment, to the smart gas service platform 120 based on the supervision user sub-platform.

The smart gas service platform 120 may be a platform for communicating a user demand and control information. The smart gas service platform 120 may obtain a flow metering result, a gas metering strategy, etc. from the smart gas device management platform 130 and send to the smart gas service platform 110.

In some embodiments, the smart gas service platform 120 may include a plurality of service sub-platforms, such as a smart gas use service sub-platform, a smart operation service sub-platform, and a smart supervision service sub-platform, respectively, to provide information related to a gas use service, a regulatory demand, and a gas operation to the gas user, the supervision user, and the governmental user.

In some embodiments, the smart gas service platform 120 may send the flow metering result, the gas metering strategy, etc., to the regulatory user sub-platform based on the smart supervision service sub-platform.

The smart gas device management platform 130 may be a platform for overall planning and coordinating connections and cooperation among various functional platforms, gathering all information of the IoT system, and providing functions of perceptual management and control management for the IoT operation system.

In some embodiments, the smart gas device management platform 130 may include a plurality of device parameter management sub-platforms and a smart gas data center. For example, the plurality of device parameter management sub-platforms may include a smart gas indoor device parameter management sub-platform and a smart gas pipeline network device parameter management sub-platform, respectively, for managing a gas indoor device parameter and a gas pipeline network device parameter.

In some embodiments, the smart gas indoor device parameter management sub-platform may include, but not limited to, a device operation parameter monitoring and warning module and a device parameter remote management module for analyzing and processing gas flow data and gas pressure data of the gas indoor device and a gas pipeline.

In some embodiments, within the smart gas indoor device parameter management sub-platform and the smart gas pipeline network device parameter management sub-platform, gas pipeline data such as a detection point where each gas ultrasonic meter locate and a distance between the detection point and a gas supply point, a distance between the detection point and a pressure regulating valve, a type of the pressure regulating valve, and a factory time for the gas ultrasonic meter may be preset.

The smart gas data center may be used to store and manage all operational information of the system 100. In some embodiments, the smart gas data center may be configured as a storage device to store data related to the gas operation, such as the gas flow data and the gas pressure data, etc.

In some embodiments, the smart gas device management platform 130 may interact respectively with the smart gas service platform 120 and the smart gas sensing network platform 140 through the smart gas data center. For example, the smart gas data center may send a gas metering strategy to the smart gas service platform 120. For another example, the smart gas data center may send the detection instruction to the smart gas sensing network platform 140 to obtain the gas flow data and the gas pressure data.

In some embodiments, the smart gas device management platform 130 may send the detection instruction to the smart gas object platform via the smart gas sensing network platform to transmit at least two sound waves of different frequencies and receive at least two echo signals at at least two time-dividing points by the gas ultrasonic meter; determine the time-dividing points at least based on time-dividing point correlation data; determining, based on the at least two echo signals, a gas flow difference; determine, based on the gas flow difference, whether a noise interference exists; and in response to a determination that the noise interference exists, adjust a gas metering strategy.

The smart gas sensing network platform 140 may be a functional platform for managing sensing communication.

In some embodiments, the smart gas sensing network platform 140 may realize function of sensing communication for sensing information and controlling information. The smart gas sensing network platform 140 may be used to interact with the smart gas data center and the smart gas object platform 150 and transmit the detection instruction.

In some embodiments, the smart gas sensing network platform 140 may include a smart gas indoor device sensing network sub-platform and a smart gas pipeline network device sensing network sub-platform, which are respectively used for obtaining the operation information of the smart gas indoor device and the smart gas pipeline network device.

The smart gas object platform 150 may be a functional platform for sensing information generation and controlling information execution. For example, the smart gas object platform 150 may transmit the sound waves based on the detection instruction and obtain the echo signal.

In some embodiments, the smart gas object platform 150 may include a smart gas indoor device object sub-platform and a smart gas pipeline network device object sub-platform. The smart gas indoor device object sub-platform and the smart gas pipeline network device object sub-platform may include the gas ultrasonic meter, an ultrasonic gas meter, a temperature sensor, a humidity sensor, a pressure sensor, and a sound sensor, etc.

In some embodiments, the smart gas object platform 150 may transmit at least two sound waves of different frequencies according to the detection instruction and receive at least two echo signals at at least two time-dividing points by a gas ultrasonic meter.

Figure 2:
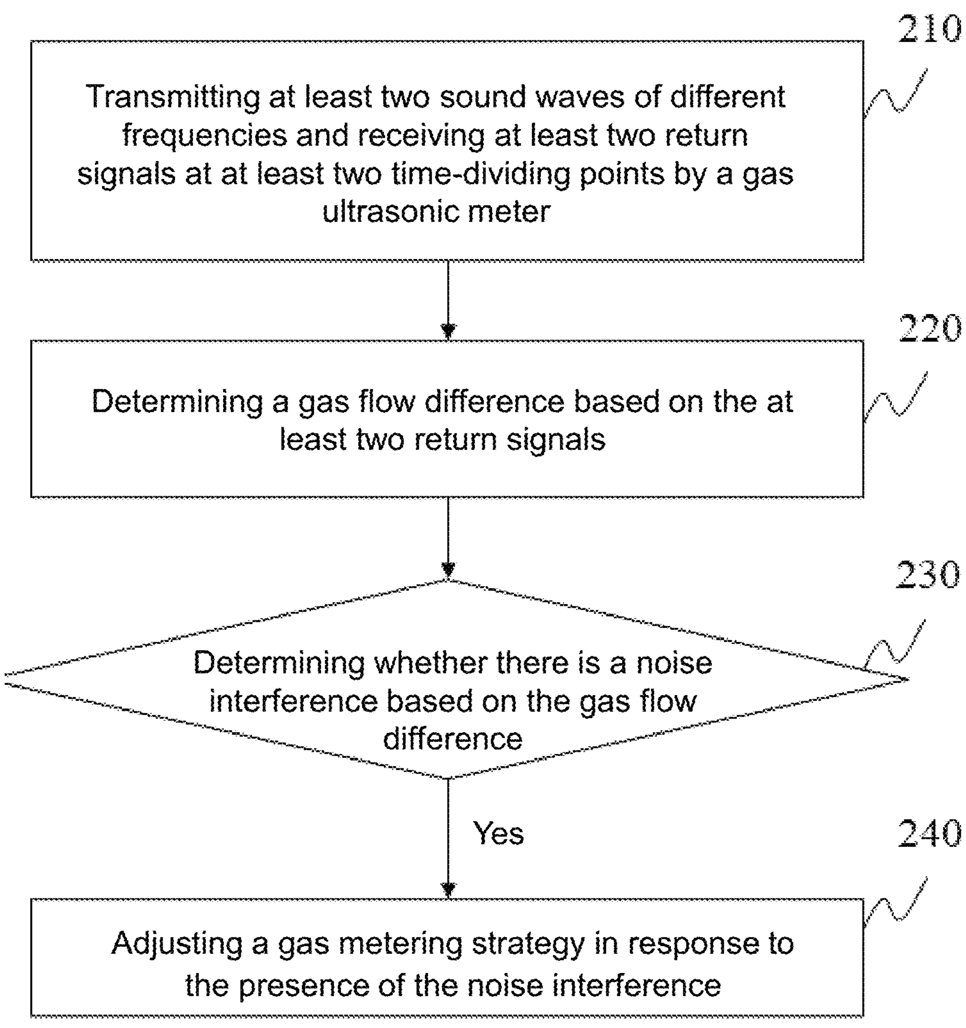
FIG. 2 is a flowchart illustrating an exemplary method for metering anti-interference of a gas ultrasonic meter according to some embodiments of the present disclosure.

For more information on the gas ultrasonic meter, the time interval, the echo signal, the time-dividing point correlation data, etc., please refer to the relevant descriptions of other drawings (e.g., FIG. 2, etc.).

In some embodiments of the present disclosure, a closed loop of information operation may be formed between the smart gas object platform and the smart gas user platform based on the system 100, and a coordinated and regular operation may be carried out under a unified management of the smart gas management platform, thereby achieving informatization and intelligence of the gas metering strategy management.

It should be noted that the above description of the system 100 and the modules thereof are provided for descriptive convenience only and does not limit the present disclosure to the scope of the cited embodiments. Those skilled in the art, having understood the principle of the system, may make any combinations of the modules or form subsystems to be connected to other modules without departing from this principle. Deformations like these are within the scope of protection of the present disclosure.

FIG. 2 is a flowchart illustrating an exemplary method for metering anti-interference of a gas ultrasonic meter according to some embodiments of the present disclosure. As shown in FIG. 2, a process 200 may include the following operations. In some embodiments, the process 200 may be performed by the smart gas device management platform 130.

In 210, transmitting at least two sound waves of different frequencies at at least two time-dividing points and receiving at least two echo signals by a gas ultrasonic meter. In some embodiments, the time-dividing points may be determined based on time-dividing point correlation data.

The gas ultrasonic meter may include various meters that measure a flow by detecting an impact of a gas flow on ultrasonic waves. The gas ultrasonic meter may transmit sound waves at a time-dividing point where the sound waves are expected to be transmitted based on a detection instruction or a preset operation mode and receive a echo signal.

The echo signal may be a signal that returns to the gas ultrasonic meter after the sound waves transmitted by the gas ultrasonic meter are propagated through fluid. For example, each gas ultrasonic meter may include a pair of transducers disposed at opposite positions and at an upstream and a downstream of the pipeline, respectively. Each transducer may be used to transmit and receive ultrasonic signals. When one of the transducers transmits the sound waves, the sound waves may propagate through the gas. After being partially absorbed by the gas or affected by the gas flow, the sound waves may then arrive at the other transducer at the opposite position to be received.

In some embodiments, the smart gas device management platform may send the detection instruction to the gas ultrasonic meter based on at least two time-dividing points and at least two different frequencies. The gas ultrasonic meter, according to the detection instruction, may transmit the sound waves and receive corresponding echo signals at one of the at least two different frequencies at each of the at least two time-dividing points in a sequential order. The sound waves transmitted at different time-dividing points may have different frequencies.

In some embodiments, the smart gas device management platform may select at least two different frequencies other than a frequency of a noise based on a history of a noise detection, or may randomly select at least two different frequencies, to transmit the sound waves through the gas ultrasonic meter. For more information on the noise detection and the frequency, please refer to the following descriptions or other accompanying drawings (e.g., FIG. 4, etc.).

The time-dividing point refers to a time point when gas flow data is detected.

The gas flow data may be a magnitude of the gas flow through a pipeline.

In some embodiments, for each time-dividing point, a first time period from transmitting the sound wave to receiving the echo signal in a downstream direction, and a second time period from transmitting the sound wave in a countercurrent direction to receiving the echo signal may be obtained, and a time difference between the first time period and the second time period may be calculated. Based on the time difference, a sound wave speed, a length of a propagation path, the gas flow data at the time-dividing point may be determined using a speed difference method.

The time-dividing point correlation data refers to the correlation data that affects the determination of the time-dividing point. In some embodiments, the time-dividing point correlation data may include at least one of gas pipeline data and gas flow data. The gas pipeline data may include at least one of a distance of a detection point from a gas supply point, a distance of the detection point from a pressure regulating valve, a type of the pressure regulating valve, a scaling situation of a gas pipeline, a pressure loss of a pipeline, etc. The gas flow data may include at least one of a gas pressure and a severe change in gas pressure. The detection point may be a position where the gas ultrasonic meter is located.

The smart gas device management platform may determine the time-dividing point based on the time-dividing point correlation data by various feasible modes. For example, the smart gas device management platform may determine time-dividing points based on the time-dividing point correlation data and their corresponding preset correspondences.

Figure 3:
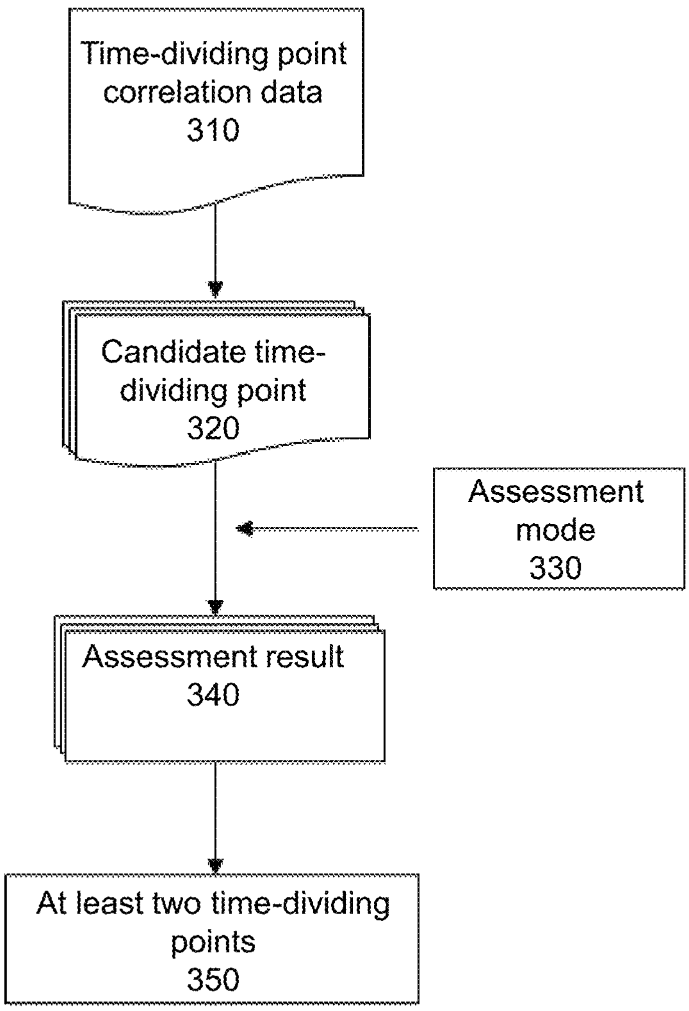
FIG. 3 is a schematic diagram illustrating an exemplary process for determining a time-dividing point according to some embodiments of the present disclosure.

The smart gas device management platform may determine the time-dividing point in other ways, as described in FIG. 3 and its related descriptions.

In 220, determining a gas flow difference based on the at least two echo signals.

The gas flow difference refers to the difference between the gas flow data determined at at least two time-dividing points. Based on the transmission and reception of ultrasound waves at each time-dividing point, the gas flow data for the time-dividing point may be determined.

In some embodiments, the smart gas device management platform may determine at least two gas flow data based on the ultrasound waves transmitted at at least two time-dividing points and the corresponding echo signals, and the difference between the at least two gas flow data may be determined as the gas flow difference.

In 230, determining whether there is a noise interference based on the gas flow difference.

The noise is a signal that may interfere with a normal operation of a gas ultrasonic meter. The noise may come from an environment, for example, temperature changes may cause fluctuations in metering results of the gas ultrasonic meter. The noise may also come from other devices, for example, a nearby pressure regulating valve may generate the noise over a wide range of frequencies including the ultrasonic frequency range. If the frequency of the noise is the same as or very close to a transmission frequency of the gas ultrasonic meter, the noise may interfere with the normal operation of the gas ultrasonic meter.

In some embodiments, the smart gas device management platform may determine whether the gas flow difference exceeds a difference threshold, and in response to the gas flow difference exceeding the difference threshold, it may be determined that there is the noise interference. The difference threshold may be set empirically.

In some embodiments, the difference threshold may be determined based on test data. For example, a known gas flow may be delivered to a pipeline under a test environment, and then detected gas flow data may be obtained by a gas ultrasonic meter, and a gas flow error between the detected gas flow data and an actual gas flow may be determined. The gas flow error may be determined for multiple times, and an average value of the flow error may be calculated as the difference threshold.

In some embodiments, the smart gas device management platform may adjust the difference threshold based on a measurement accuracy of the gas ultrasonic meter, and/or a pressure difference before and after the pressure regulating valve when regulating the gas pressure. The difference threshold may be negatively correlated with the measurement accuracy and positively correlated with the pressure difference. In some embodiments, the smart gas device management platform may determine a final difference threshold by performing a weighted summation based on the two aforementioned adjusted difference thresholds.

In 240, in response to a determination that the noise interference exists, adjusting a gas metering strategy.

The gas metering strategy may be a mode of measuring the gas flow, and may include, for example, the frequency of sound waves transmitted by the gas ultrasonic meter, the time-dividing point, etc.

In response to the presence of noise interference, the smart gas device management platform may adjust the gas metering strategy in a variety of feasible ways. For example, the frequency of the transmitted sound waves may be adjusted, a detection cycle may be shortened, or a plurality of time-dividing points may be added to the detection cycle and new transmission frequencies may be added accordingly. For more contents on the detection cycle, please refer to FIG. 3 and the related descriptions.

Figure 4:
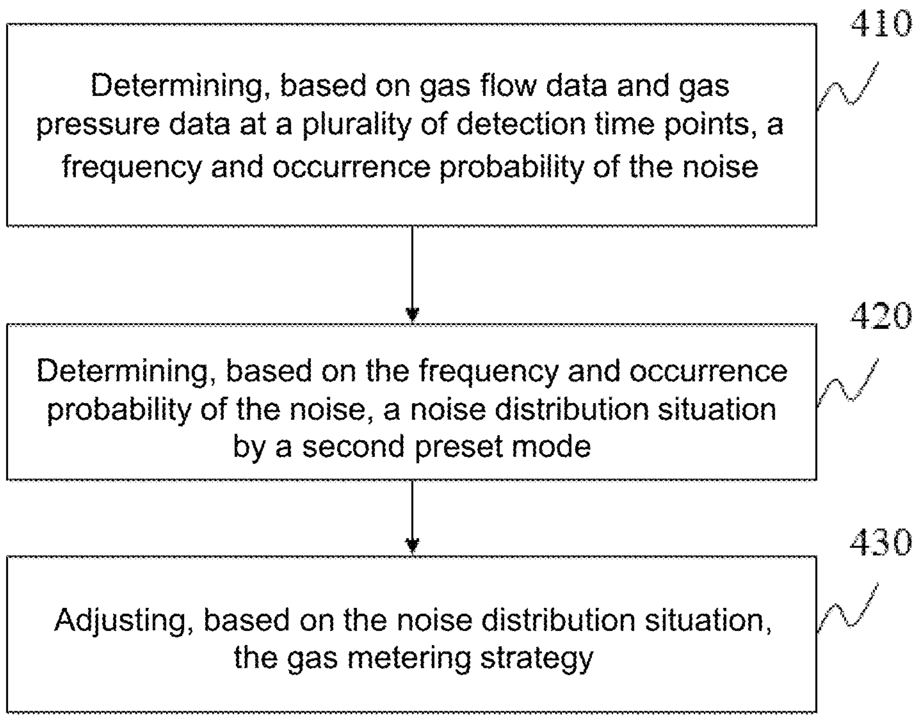
FIG. 4 is a flowchart illustrating an exemplary process for adjusting a gas metering strategy according to some embodiments of the present disclosure.

For more contents on the gas metering strategy adjusted by the smart gas device management platform using other modes, please refer to FIG. 4 and the related descriptions.

In some embodiments of the present disclosure, a difference of gas flow data (i.e., the gas flow difference) measured at at least two time-dividing points may be determined by the gas ultrasonic meter through different frequencies of sound waves and corresponding echo signals at the at least two time-dividing points. In this way, it is determined that whether there is the noise interference, and the gas metering strategy may be adjusted accordingly. In this way, at least two different frequencies of the sound waves may be transmitted by time-dividing, so as to achieve a noise determination, thereby reducing a cost of hardware modification and maintenance. At the same time, the gas metering may be performed with a minimal impact from the noise, thereby improving a reliability of the measurement result and an effectiveness of the gas metering.

It should be noted that the description of the process 200 above is only exemplary and illustrative, and does not restrict the scope of the present disclosure. For those skilled in the art, various corrections and changes may be made to the process 200 under the guidance of the present disclosure. However, these corrections and changes remain within the scope of the present disclosure.

FIG. 3 is a schematic diagram illustrating an exemplary process for determining a time-dividing point according to some embodiments of the present disclosure.

In some embodiments, at least two time-dividing points may form at least one time-dividing point group. In one time-dividing point group, a time difference between the at least two time-dividing points may be configured as a preset time difference of the time-dividing points.

In some embodiments, a smart gas device management platform may be configured to obtain time-dividing point correlation data, and determine, based on the time-dividing point correlation data, the at least two time-dividing points by a first preset mode.

In some embodiments, the at least two time-dividing points may constitute at least one time-dividing point group, and a plurality of time-dividing point groups may be set according to a detection cycle. The detection cycle may be a cycle for detecting presence of noise interference. The time difference between at least two of the time-dividing points in a time-dividing point group may be configured as the preset time difference of the time-dividing points. Therefore, a length of an interval between each time-dividing point group may be equal to the detection cycle.

The preset time difference of time-dividing points refers to a preset time interval between two adjacent time-dividing points.

In some embodiments, it may be determined whether there is the noise interference through the detection cycle. In each detection cycle, the smart gas device management platform may use the gas ultrasonic meter to transmit the sound waves of different frequencies according to a time sequence of at least two time-dividing points and the preset time difference, and receive at least two corresponding echo signals to determine whether there is the noise interference.

In some embodiments, the smart gas device management platform may obtain real-time auto-monitored time-dividing point correlation data or real-time-input time-dividing point correlation data after detected by detection personnel from the smart gas indoor device parameter management sub-platform, the smart gas pipeline network device parameter management sub-platform, or the smart gas object platform.

For more information on the time-dividing points and the time-dividing point correlation data, please refer to FIG. 2 and the related descriptions.

In some embodiments, the smart gas device management platform may determine the at least two time-dividing points based on the time-dividing point correlation data using a first preset mode such as a mapping relationship, a curve fit, etc. For example, the mapping relationship may include a correspondence between various time-dividing point correlation data and corresponding time-dividing points.

In some embodiments, as shown in FIG. 3, the smart gas device management platform may determine at least one group of candidate time-dividing points 320 based on time-dividing point correlation data 310. An assessment result 340 of the at least one group of candidate time-dividing points may be determined Based on an assessment mode 330; and at least two time-dividing points 350 may be determined based on the assessment result 340.

The candidate time-dividing points 320 may be alternative options available for determining the time-dividing points.

In some embodiments, the smart gas device management platform may randomly generate the at least one group of candidate time-dividing points 320.

The assessment results 340 of the candidate time-dividing points may include usable or unusable, etc.

In some embodiments, the assessment mode 330 may include: determining whether a candidate detection cycle included in the candidate time-dividing points 320 satisfies a preset cycle condition, and determining whether a candidate time difference of time-dividing point included in the candidate time-dividing points 320 satisfies a preset time difference condition, and if both the preset cycle condition and the preset time difference condition are satisfied, the assessment results 340 of the candidate time-dividing points 320 may be usable.

In some embodiments, the preset cycle condition may include the candidate detection cycle greater than a minimum cycle threshold and less than a historical detection cycle. The minimum cycle threshold may be set based on experience. The historical detection cycle may be the minimum or average value of the detection cycle in the detection history of a current pipeline, etc., and may be determined based on the average value of the historical detection cycles of other pipelines that are the same or similar to the current pipeline. It may be determined whether the pipeline is the same or similar to the current pipeline by comparing the time-dividing point correlation data of the pipelines. The setting of the preset cycle condition may avoid a frequent testing that results in a waste of resources, and may also shorten a testing cycle based on the historical testing cycle, so as to adapt to a fact that the pipeline and its components are more prone to noise with a longer use time.

In some embodiments, the preset time difference condition may include the candidate time difference of time-dividing point being greater than a preset time difference threshold. The preset time difference threshold may be set as the time difference in which the sound waves of at least two frequencies do not interfere with each other, for example, the preset time difference threshold may be set to a time required for receiving the corresponding echo signal of a sound wave transmitted at a previous time-dividing point.

In some embodiments, the preset time difference threshold may be correlated with a length of the pipeline where the gas ultrasonic meter is located, for example, the correlation may include a positive correlation.

In some embodiments, a candidate time-dividing point assessed to be usable may be identified as a time-dividing point at which at least two sound waves of different frequencies are transmitted. In some embodiments, if the usable candidate time-dividing points include a plurality of groups, one of the groups may be randomly selected.

In some embodiments, by determining the at least one group of candidate time-dividing points based on the time-dividing point correlation data, the at least two time-dividing points may be determined based on the assessment results of the at least one group of candidate time-dividing points. As the time-dividing point correlation data reflecting a pipeline situation is considered in determining the time-dividing points, and the candidate time-dividing points are assessed by the assessment mode, the determined time-dividing points may meet detection requirements, making the determination of the time-dividing points more reasonable.

In some embodiments, the at least two time-dividing points may also be associated with pipeline environmental data.

The pipeline environmental data refers to data related to an environment where the pipeline is located, which may include, for example, temperature data, humidity data, etc. In some embodiments, the smart gas device management platform may obtain the pipeline environmental data generated by corresponding sensors, etc., from the smart gas object platform via the smart gas sensing network platform.

In some embodiments, the smart gas device management platform may determine, based on the pipeline environmental data, a pipeline environmental impact factor through a preset correspondence table of impact factors. The platform may then adjust the at least two time-dividing points using the pipeline environmental impact factor and a time-dividing adjustment algorithm. The preset correspondence table of impact factors may include various temperature data, humidity data, as well as their corresponding pipeline environmental impact factors.

In some embodiments, the greater the impact of temperature and humidity data on a gas pressure change, the greater the pipeline environmental impact factor.

In some embodiments, the time-dividing adjustment algorithm may include subtracting a first amount of impact of the pipeline environmental impact factor on the detection cycle from the detection cycle, and/or adding the preset time difference of the time-dividing point and a second amount of impact of the pipeline environmental impact factor on the preset time difference of time-dividing point.

In some embodiments, the time-dividing adjustment algorithm may be implemented using the following formula:

$$T' = T * (1 - F) \tag{1}$$

$$\Delta t' = \Delta t * (1 + F)$$

where T and Δt respectively indicates the detection cycle and the preset time difference of the time-dividing point. The detection cycle T and the preset time difference of the time-dividing point Δt corresponding to the at least two time-dividing points may be obtained by referring to the mode of determining at least two time-dividing points based on the assessment result mentioned above.

In some embodiments of the present disclosure, considering a possible impact of the pipeline environmental data on the pipeline and a detection process, the accuracy of determining the time-dividing point may be improved by setting a time-dividing point related to the pipeline environmental data, making the time-dividing point applicable to various environments to achieve a more accurate gas flow measurement.

In some embodiments of the present disclosure, by setting a plurality of time-dividing point groups based on the detection cycle and setting the preset time difference between at least two time-dividing points, the data processing may be made more regular, which is beneficial for subsequent noise-related analysis. By determining the at least two time-dividing points based on the time-dividing point correlation data using the first preset mode, a randomness of the time-dividing transmitted sound waves may be reduced, which is advantageous for improving a success rate of the noise detection and the flow measurement.

FIG. 4 is a flowchart illustrating an exemplary process for adjusting a gas metering strategy according to some embodiments of the present disclosure. As shown in FIG. 4, a process 400 may include the following operations.

In 410, determining, based on gas flow data and gas pressure data at a plurality of detection time points, a frequency and occurrence probability of the noise.

The detection time point refers to the time point at which the gas flow data and the gas pressure data are detected. In some embodiments, the plurality of detection time points may be a consecutive group of detection time points within a preset time interval.

For more contents on the gas flow data, please refer to FIG. 2 above and the related descriptions.

The gas pressure data may include a magnitude of a pressure of a gas pipeline. The smart gas device management platform may obtain the gas pressure data detected by a pressure sensor that comes with a gas ultrasonic meter, or obtain the gas pressure data generated by the pressure sensor from a smart gas object platform.

The occurrence probability of the noise refers to the occurrence probability of noise of a certain frequency.

The smart gas device management platform may determine the frequency and the occurrence probability of the noise based on the gas flow data and the gas pressure data at the plurality of detection time points in various feasible ways, such as, a vector matching mode. For example, the smart gas device management platform may construct a vector to be matched based on the gas flow data and the gas pressure data of the plurality of detection time points, conduct a search in a vector database based on the vector to be matched, and obtain a reference vector whose vector distance from the vector to be matched satisfies a distance threshold. The frequency and occurrence probability of a historical noise corresponding to the reference vector may be determined as the frequency and occurrence probability of a current noise. The vector database may be used to store a number of historical vectors and the frequencies and occurrence probabilities of their corresponding historical noises. The historical vectors may be constructed based on historical gas flow data and historical gas pressure data from a plurality of historical detection time points.

Figure 5:
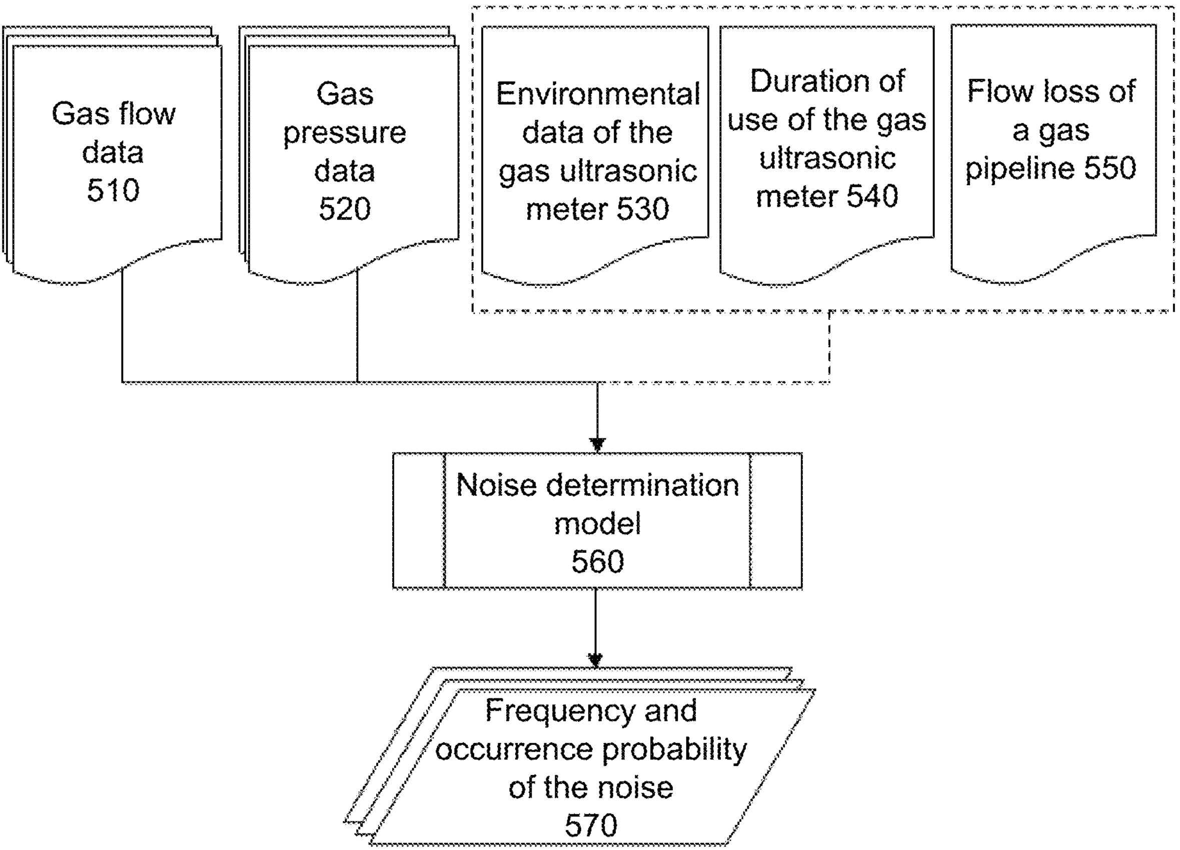
FIG. 5 is a schematic diagram illustrating an exemplary noise determination model according to some embodiments of the present disclosure.

The smart gas device management platform may determine the frequency and occurrence probability of the noise based on the gas flow data and the gas pressure data at a plurality of detection time points through other modes, as shown in FIG. 5 and the related description.

In 420, determining, based on the frequency and occurrence probability of the noise, a noise distribution situation by a second preset mode.

The noise distribution situation refers to a distribution situation of the frequency and occurrence probability of a possible noise. In some embodiments, the noise distribution situation may include a frequency distribution and a probability distribution. For example, the frequency distribution may include a frequency value or a frequency range of the noise, as well as a time point at which the noise occurs, etc. The probability distribution may include a magnitude of the occurrence probability of the noise with different frequencies (i.e., the occurrence probability), etc.

The second preset mode may include various feasible modes, such as a statistical mode, a probabilistic model, etc. For example, the smart gas device management platform may calculate the frequency and occurrence probability of the noise through a histogram and other modes based on the frequency and occurrence probability of the noise, and select a corresponding probability distribution model (e.g., a normal distribution, an exponential distribution, etc.). Through a fitting algorithm, data such as the frequency and occurrence probability of the noise may be fitted to the probability distribution model to obtain the noise distribution situation.

Figure 6:
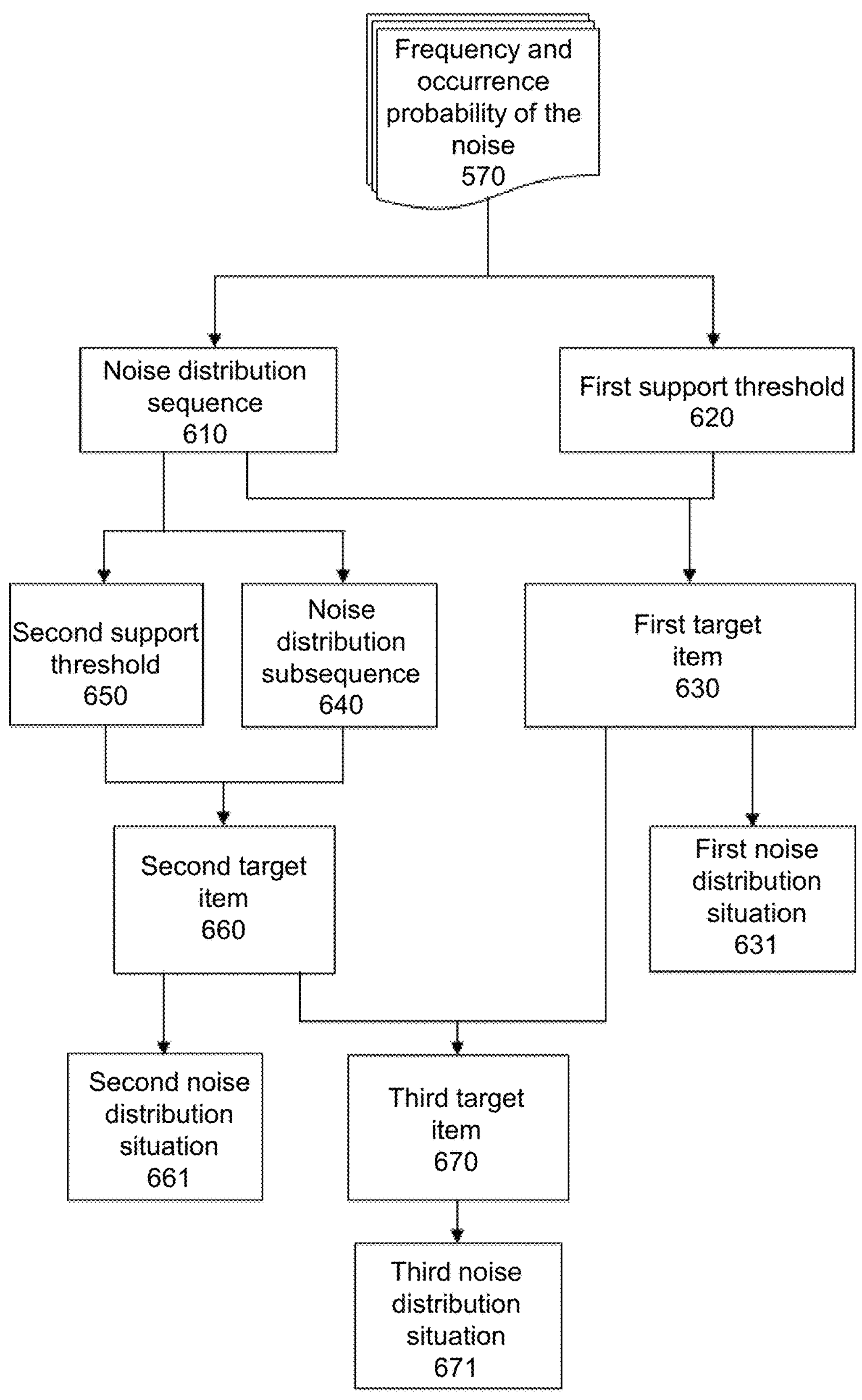
FIG. 6 is a schematic diagram illustrating an exemplary process for determining a noise distribution situation according to some embodiments of the present disclosure.

The smart gas device management platform may determine the noise distribution situation based on the frequency and occurrence probability of the noise using the second preset mode, in combination with other modes, as shown in FIG. 6 and the related descriptions.

In 430, adjusting, based on the noise distribution situation, the gas metering strategy.

The smart gas device management platform may adjust the gas metering strategy based on the noise distribution situation using various feasible modes. For example, based on the noise distribution situation, a frequency of the transmitted sound waves may be adjusted to a frequency different from the noise frequency, or a gas ultrasonic meter that transmits the sound waves at the noise frequency may be replaced, or the frequency with the lowest probability in the probability distribution may be selected as the frequency of the transmitted sound waves, etc. For instance, when a pressure regulating valve regulates the pressure when the pressure difference exceeds a certain range, the noise may occur during the adjustment process, the smart gas device management platform may determine a time other than a noise occurrence time as the time-dividing point at which the sound waves are transmitted by counting the noise occurrence time.

The smart gas device management platform may adjust the gas metering strategy based on the noise distribution situation through other modes, please refer to FIG. 6 and the corresponding descriptions for details.

In some embodiments of the present disclosure, based on the gas flow data and the gas pressure data at a plurality of detection time points, the frequency and occurrence probability of the noise may be determined. Furthermore, the noise distribution situation may be determined by the second preset mode, thereby obtaining an overall distribution situation of the noise occurrence in the pipeline. By adjusting the gas metering strategy based on the noise distribution situation, a metering accuracy may be improved.

FIG. 5 is a schematic diagram illustrating an exemplary noise determination model according to some embodiments of the present disclosure.

In some embodiments, as shown in FIG. 5, a smart gas device management platform may determine a frequency and occurrence probability of a noise 570 based on gas flow data 510 and gas pressure data 520 at a plurality of detection time points by a noise determination model 560.

The input of the noise determination model 560 may include the gas flow data 510 and the gas pressure data 520 at the plurality of detection time points, and the output of the noise determination model 560 may include a frequency and occurrence probability of the noise 570.

In some embodiments, the gas flow data 510 and the gas pressure data 520 may be arranged in a chronological order of the detection time points as an input sequence of the noise determination model 560. For more information on the detection time point, the gas flow data, and the gas pressure data, please refer to FIGS. 2 and 4 and the related descriptions.

In some embodiments, an output of the noise determination model 560 may be a sequence of frequencies and occurrence probabilities of the noise corresponding to the input sequence.

In some embodiments, the noise determination model 560 may be a machine learning model such as a recurrent neural network model.

The smart gas device management platform may train the noise determination model 560 by using a plurality of labeled first training samples. In some embodiments, the first training samples may at least include sample gas flow data and sample gas pressure data, and the labels may include a presence or absence of the noise as well as an actual frequency of the noise corresponding to the group of first training samples. The labels may be determined through manual or automatic labeling.

For example, in an experimental environment, a plurality of first reference data and a plurality of second reference data may be obtained respectively. The plurality of first reference data and the plurality of second reference data may respectively include test data with no noise interference applied and test data with a known noise interference applied. The test data may include the gas flow data and the gas pressure data monitored at a plurality of consecutive time points. The first reference data may be labeled as without the noise interference (e.g., 0). The second reference data may be labeled as with the noise interference (e.g., 1), and with the frequency of the noise applied. The second reference data may be taken as the first training sample.

In some embodiments, as shown in FIG. 5, an input to the noise determination model 560 may further include at least one of environmental data of the gas ultrasonic meter 530, a duration of use of the gas ultrasonic meter 540, and a flow loss of a gas pipeline 550.

In some embodiments, the environmental data of the gas ultrasonic meter 530 may include a temperature, a humidity, an environmental noise level, etc. of the environment in which the gas ultrasonic meter is located, and a mode of obtaining such data may be referred to contents above related to the mode of obtaining the environmental data of a pipeline.

The duration of use of the gas ultrasonic meter 540 may be determined based on an installation time combined with a current time.

The flow loss of the gas pipeline 550 refers to a situation that a reduction in gas flow occurs during a transportation process through the pipeline. In some embodiments, the flow loss of the gas pipeline 550 may be evaluated based on historical gas flow data or real-time detected gas flow data associated with the pipeline.

In some embodiments, when the input to the noise determination model 560 also include at least one of the environmental data of the gas ultrasonic meter 530, the duration of use of the gas ultrasonic meter 540, and the flow loss of the gas pipeline 550, correspondingly, the first training sample may also include the environmental data of a sample gas ultrasonic meter, the duration of use of the sample gas ultrasonic meter, and the flow loss of a sample gas pipeline.

In some embodiments of the present disclosure, when determining the frequency and occurrence probability of the noise, by taking at least one of the environmental data of the gas ultrasonic meter, the duration of use of the gas ultrasonic meter, and the flow loss of the gas pipeline as the input of the noise determination model, possible effects brought by a change in the environment of the gas ultrasonic meter, a deterioration of the gas ultrasonic meter due to use, or the flow loss of the gas pipeline on the determination of the noise may be excluded, thereby improving the accuracy in predicting the frequency and occurrence probability of the noise.

In some embodiments of the present disclosure, the frequency and occurrence probability of the noise may be determined by the noise determination model based on the gas flow data and gas pressure data at the plurality of detection time points, thereby exploring an intrinsic relationship between the gas flow data, the gas pressure data, and the noise. This enables a quick and accurate determination of the frequency and occurrence probability of the noise, provides a foundation for determining the noise distribution situation and adjusting gas metering measurements.

FIG. 6 is a schematic diagram illustrating an exemplary process for determining a noise distribution situation according to some embodiments of the present disclosure.

In some embodiments, the noise distribution situation may include a first noise distribution situation.

In some embodiments, as shown in FIG. 6, a smart gas device management platform may obtain a noise distribution sequence 610 based on the frequency and occurrence probability of the noise 570, and determine a first support threshold 620. Based on the noise distribution sequence 610 and the first support threshold 620, a first target item 630 may be determined. Based on the first target item 630, a first noise distribution situation 631 may be determined.

The first noise distribution situation refers to a distribution situation of the frequency and occurrence probability of the noise determined for all the gas ultrasonic meters in a specific gas pipeline area.

The first noise distribution situation 631 may be used to adjust a gas metering strategy for all the gas ultrasonic meters.

The noise distribution sequence refers to a sequence of the frequencies and probabilities of occurrence of the noise that has an effect on all the gas ultrasonic meters. In some embodiments, the noise distribution sequence 610 may include a collection of a plurality of items, each item including the frequency and occurrence probability of noise that interferes a single gas ultrasonic meter. For example, the noise distribution sequence 610 may include "(frequency value, metering meter identification, probability interval), . . . , (frequency value', measurement meter identification', probability interval')", etc. The probability interval may be preset, such as 0%~40%, 40%~70%, 70%~100%, etc.

In some embodiments, the smart gas device management platform may transform the noise into the noise distribution sequence 610 based on the frequency and occurrence probability of the noise 570 output from the noise determination model 560.

The first support threshold 620 may be a threshold for determining whether an item or a group of items (a plurality of items) in the noise distribution sequence occurs frequently, which may be set based on an actual situation or experience.

The first target item may be an item or a group of items that occurs more frequently than the first support threshold in the noise distribution sequence. The first target item 630 may reflect the frequency and occurrence probability of the noise that is most likely to affect all the gas ultrasonic meters from an overall perspective. In some embodiments, based on the plurality of items included in the first target item, items with the same frequency and probability interval, or with different probability intervals, may be counted. For example, if there are 10 gas ultrasonic meters, it may be known that 8 gas ultrasonic meters may all be likely to be affected by the noise at frequency B according to statistics.

In some embodiments, if an item or a group of items appears more frequently in the noise distribution sequence 610 than the first support threshold 620, then the item or the group of items may be a frequently occurring item or a group of frequently occurring items in the noise distribution sequence, and the item or the group of items may be determined as the first target item 630.

In some embodiments, the smart gas device management platform may determine the frequency and occurrence probability of the noise included in the first target item 630 as the first noise distribution situation 631 based on the first target item 630.

In some embodiments, the noise distribution situation may also include a second noise distribution situation.

In some embodiments, as shown in FIG. 6, the smart gas device management platform may determine a second support threshold 650 and determine at least one noise distribution subsequence 640 based on the noise distribution sequence 610; determine, based on the noise distribution subsequence 640 and the second support threshold 650, a second target item 660; and determine, based on the second target item 660, a second noise distribution situation 661.

The second noise distribution situation refers to the distribution situation of noise frequencies and occurrence probabilities determined for the single gas ultrasonic meter. The single gas ultrasonic meter may be any one of all the gas ultrasonic meters.

The second noise distribution situation 661 may be used to adjust the gas metering strategy for the single gas ultrasonic meter.

The noise distribution subsequence refers to a sequence of frequencies and probabilities of noise occurrences that affect the individual gas ultrasonic meter. In some embodiments, the noise distribution subsequence 640 for the single gas ultrasonic meter may consist of a group of items, each item representing a noise frequency and probability that interfere with the gas ultrasonic meter. For example, the noise distribution subsequence 640 may include "(frequency A, meter 1, probability interval 1), (frequency B, meter 1, probability interval 3), etc."

In some embodiments, the smart gas device management platform may filter the noise distribution subsequence 640 associated with the single gas ultrasonic meter based on the meter identification and the noise distribution sequence 610.

The second support threshold may be a threshold used to determine whether an item or a group of items (a plurality of items) in the noise distribution subsequence occurs frequently. The second support threshold may be set based on actual situations or experience. In some embodiments, an initial second support threshold may be set, and the second support threshold may be adjusted based on a number of frequently occurring items or sets of items.

The second target item may be an item or a group of items in the noise distribution subsequence 640 that has a higher number of occurrences than the second support threshold 650, and may be used to reflect the frequency and probability of the noise that the single gas ultrasonic meter is most susceptible to interference.

In some embodiments, the smart gas device management platform may determine the frequency and probability of the noise included in the second target item 660 as the second noise distribution situation 661 based on the second target item 660.

In some embodiments, each gas ultrasonic meter may correspond to the noise distribution subsequence, the second support threshold, the second target item, and the corresponding second noise distribution situation.

In some embodiments, the noise distribution situation may further include a third noise distribution situation.

In some embodiments, as shown in FIG. 6, the smart gas device management platform may determine the third target item 670 based on the first target item 630 and the second target item 660. The smart gas service platform may determine the third noise distribution situation 671 based on the third target item 670.

The third noise distribution situation may reflect a distribution situation of the gas ultrasonic meters that are susceptible to noise interference at the most likely frequency and occurrence probability of the noise.

The third noise distribution situation 671 may be used to adjust the gas metering strategy for the ultrasonic gas meters that are susceptible to interference.

The third target item 670 may be formed by a plurality of items related to the gas ultrasonic meters that are susceptible to interference. The third target item 670 may be used to determine the gas ultrasonic meters that are susceptible to noise interference at the most likely frequency and occurrence probability of the noise, for the purpose of determining the gas metering strategy more targetedly.

In some embodiments, the smart gas device management platform may obtain an intersection of the first target item 630 and the second target item 660 to determine the third target item 670. In some embodiments, there may be a plurality of gas ultrasonic meters and their corresponding second target items. The smart gas device management platform may obtain the intersections of the first target item and the plurality of second target items, respectively, and combine the plurality of intersections to determine the third target item.

In some embodiments, the smart gas device management platform may determine the frequency and occurrence probability of the noise included in the third target item as the third noise distribution situation 671 based on the third target item 670.

In some embodiments, the smart gas device management platform may adjust the gas metering strategy for the gas ultrasonic meters that are susceptible to interference based on the third target item.

In some embodiments, the smart gas device management platform may adjust the gas metering strategy based on at least one of the first noise distribution situation 631, the second noise distribution situation 661, and the third noise distribution situation 671.

In some embodiments, the smart gas device management platform may determine the gas ultrasonic meter that is susceptible to noise interference at the most likely frequency and occurrence probability of the noise based on the third noise distribution situation 671. The smart gas service platform may further adjust the emission frequency of that gas ultrasonic meter based on the third target item.

In some embodiments, the smart gas device management platform may determine the frequency and occurrence probability of a noise that is most susceptible to interference a single gas ultrasonic meter based on the second noise distribution situation 661 corresponding to the instrument. Furthermore, the source of the noise may be determined and a corresponding gas metering strategy may be selected based on the noise source.

In some embodiments, the smart gas device management platform may train a noise classification model by combining a pattern recognition algorithm with a machine learning model or a neural network model to distinguish between different sources of noises, such as a neighboring pressure regulating valve, a pipe scaling, or the like. Correspondingly, if the noise source is a neighboring pressure regulating valve, the emission frequency or a time-dividing point of the gas ultrasonic meter may be adjusted. If the noise source is the pipeline scaling, the gas metering strategy may be adjusted to include descaling operations followed by a manual metering.

In some embodiments, the smart gas device management platform may determine, based on the first noise distribution situation 631, the frequency and occurrence probability of the noise that is most likely to interfere with all gas ultrasonic meters, and the smart gas service platform may make overall adjustments to the gas metering strategy of all gas ultrasonic meters. For example, the transmission frequencies of all gas ultrasonic meters may be adjusted to avoid the frequency of the noise with the highest occurrence probability.

In some embodiments of the present disclosure, by adjusting the gas metering strategy based on at least one of the first noise distribution situation, the second noise distribution situation, and the third noise distribution situation, a more targeted measurement may be better taken according to a degree of impact of the noise on the gas ultrasonic meters, so as to reduce the impact of the noise on the flow metering, thereby improving the accuracy of flow metering. By adjusting the gas metering strategy according to different noise distribution situations, the gas metering strategy may be better adapted to the actual situation, thereby improving a flexibility of the adjustment.

In some embodiments of the present disclosure, by determining the third target item based on the first target item and the second target item, and further determining the third noise distribution situation, a positioning of the gas ultrasonic meters that are more susceptible to interference may be achieved. After that, based on the third noise distribution situation, the metering strategy of the gas ultrasonic meters that are more susceptible to interference may be specifically adjusted, which minimizes the costs of adjustment and improves an overall effectiveness of gas metering.

In some embodiments of the present disclosure, by determining the second target item based on the noise distribution subsequence and the second support threshold, and further determining the second noise distribution situation, the noise interference of each gas ultrasonic meter may be obtained, which is beneficial for a timely detection of abnormal gas ultrasonic meters. According to the second noise distribution situation, corresponding measures such as replacing or adjusting the metering strategy may be taken to reduce an unnecessary interference with other normally functioning gas ultrasonic meters and save maintenance costs.

In some embodiments of the present disclosure, the first target item may be determined by the noise distribution sequence and the first support threshold, and the first noise distribution situation may be further determined, which helps to obtain the overall situation of all gas ultrasonic meters in the pipeline affected by the noise, enables a comprehensive management and optimization of the flow metering of the pipeline, improves the efficiency of adjusting the flow metering strategies, and enhances the overall reliability and accuracy of metering.

The basic concepts have been described above. It is evident that for those skilled in the art, the detailed disclosure above is merely an example and does not limit the present disclosure. Those skilled in the art may make various modifications, improvements, and corrections to the present disclosure. Such modifications, improvements, and corrections are still within the spirit and scope of the exemplary embodiments of the present disclosure.

Furthermore, the present disclosure uses specific terminology to describe embodiments thereof. Two or more references to "an embodiment" or "one embodiment" or "a single embodiment" at different locations in the present disclosure do not necessarily refer to the same embodiment. Additionally, certain features, structures, or characteristics in one or more embodiments of the present disclosure may be suitably combined.

Moreover, the order of the sequences described herein, the use of numerical letters, or the use of other names is not intended to define the order of processes and methods of the present disclosure, unless expressly stated in the claims. Some details of the embodiments are for illustrative purposes only, and the attached claims are not limited to the disclosed embodiments. Instead, the claims are intended to cover all modifications and equivalents that are consistent with the essence and scope of the embodiments of the present disclosure. For example, although the implementations of various components described above are embodied in a hardware device, they may also be implemented as a software-only solution, such as installation on an existing server or mobile device.

Similarly, it should be noted that, in order to simplify the presentation of the disclosure of the present disclosure and help the understanding of one or more embodiments of the present disclosure, the foregoing descriptions of embodiments of the present disclosure sometimes group multiple features together in a single embodiment, accompanying drawing, or in the descriptions thereof. However, this method of disclosure does not imply that the objects of the present disclosure require more features than those mentioned in the claims. Indeed, embodiment features are less than all features of a single foregoing disclosed embodiment.

In some embodiments, the numerical parameters used in the present disclosure and the claims are approximations, which may change depending on the desired characteristics of individual embodiments. In some embodiments, the numerical parameters should take into account the specified number of valid digits and use a general digit retention method.

Each patent, patent application, patent application publication and other materials cited herein, such as articles, books, instructions, publications, documents, etc., are hereby incorporated by reference in their entirety Except for the application history documents that are inconsistent or conflicting with the contents of the present disclosure, and the documents that may limit the widest range of the claim of the present disclosure (currently or later attached to this application) are excluded from the present disclosure It should be noted that, if there is any inconsistency or conflict between the descriptions, definitions, and/or use of terms associated with any incorporated material and terms associated with this document, the descriptions, definitions, and/or terms used in this document shall prevail Finally, it should be understood that the embodiments described in the present disclosure are only used to illustrate the principles of the embodiments of the present disclosure. Other deformations may also fall within the scope of the present disclosure.

What is claimed is:

1. A method for determining a gas metering strategy, wherein the method is executed by a smart gas device management platform of a smart gas Internet of Things (IoT) system for determining the gas metering strategy, the method comprising:

obtaining time-dividing point correlation data;

determining, based on the time-dividing point correlation data, at least one group of candidate time-dividing points;

determining, based on an assessment mode, an assessment result of the at least one group of candidate time-dividing points;

determining, based on the assessment result, the at least two time-dividing points, wherein the at least two time-dividing points form at least one group of time-dividing point groups;

transmitting at least two sound waves of different frequencies at the at least two time-dividing points and receiving at least two echo signals by the gas ultrasonic meter;

determining, based on the at least two echo signals, a gas flow difference;

determining, based on the gas flow difference, whether a noise interference exists; and in response to a determination that the noise interference exists, adjusting the gas metering strategy.

2. The method of claim 1, wherein the adjusting the gas metering strategy in response to a determination that the noise interference exists, comprises:

determining, based on gas flow data and gas pressure data at a plurality of detection time points, a frequency and occurrence probability of noise;

determining, based on the frequency and occurrence probability of the noise, a noise distribution situation by a preset mode, the noise distribution situation including a frequency distribution and a probability distribution; and adjusting, based on the noise distribution situation, the gas metering strategy.

3. The method of claim 2, wherein the determining, based on gas flow data and gas pressure data at a plurality of detection time points, a frequency and occurrence probability of the noise comprises:

determining, based on the gas flow data and the gas pressure data at the plurality of detection time points, the frequency and occurrence probability of the noise by a noise determination model, the noise determination model being a machine learning model.

4. The method of claim 3, wherein an input of the noise determination model further includes at least one of environmental data of the gas ultrasonic meter, a duration of use of the gas ultrasonic meter, and a flow loss of a gas pipeline.

5. The method of claim 2, wherein the noise distribution situation includes a first noise distribution situation; and the determining, based on the frequency and occurrence probability of the noise, a noise distribution situation by a preset mode comprises:

obtaining, based on the frequency and occurrence probability of the noise, a noise distribution sequence, and determining a first support threshold;

determining, based on the noise distribution sequence and the first support threshold, a first target item; and determining, based on the first target item, the first noise distribution situation.

6. The method of claim 5, wherein the noise distribution situation further includes a second noise distribution situation; and the determining, based on the frequency and occurrence probability of the noise, a noise distribution situation by a preset mode further comprises:

determining, based on the noise distribution sequence, at least one noise distribution subsequence, and determining a second support threshold;

determining, based on the noise distribution subsequence and the second support threshold, a second target item; and determining, based on the second target item, the second noise distribution situation.

7. The method of claim 6, wherein the noise distribution situation further includes a third noise distribution situation; and the determining, based on the frequency and occurrence probability of the noise, a noise distribution situation by a preset mode further comprises:

determining, based on the first target item and the second target item, a third target item; and determining, based on the third target item, the third noise distribution situation.

8. The method of claim 7, wherein the adjusting, based on the noise distribution situation, the gas metering strategy comprises:

adjusting, based on at least one of the first noise distribution situation, the second noise distribution situation, and the third noise distribution situation, the gas metering strategy.

9. A non-transitory computer readable medium, comprising computer instructions that, when executed by a computer, directs the computer to perform a method of claim 1.

10. A smart gas Internet of Things (IoT) system for determining a metering strategy, wherein the system includes a smart gas user platform, a smart gas service platform, a smart gas sensing network platform, a smart gas object platform, and a smart gas device management platform, wherein the smart gas user platform includes a plurality of user sub-platforms;

the smart gas service platform includes a plurality of service sub-platforms;

the smart gas device management platform includes a plurality of device parameter management sub-platforms and a smart gas data center;

the smart gas sensing network platform is configured to interact with the smart gas data center and the smart gas object platform;

the smart gas object platform is configured to transmit sound waves and obtain echo signal based on a detection instruction, wherein the smart gas object platform includes a gas ultrasonic meter;

the smart gas device management platform is configured to:

send the detection instruction to the smart gas object platform through the smart gas sensing network platform, transmit at least two sound waves of different frequencies at the at least two time-dividing points and receive at least two echo signals by the gas ultrasonic meter; wherein the at least two time-dividing points form at least one group of time-dividing point groups, and the at least two time-dividing points is determined based on an assessment result of at least one group of candidate time-dividing points, wherein the assessment result is determined based on an assessment mode, and the at least one group of candidate time-dividing points is determined based on the time-dividing point correlation data obtained by the smart gas device management platform; and determine, based on the at least two echo signals, a gas flow difference; determine, based on the gas flow difference, whether a noise interference exists; and in response to a determination that the noise interference exists, adjust a gas metering strategy.

11. The IoT system of claim 10, wherein the smart gas device management platform is further configured to:

determine, based on gas flow data and gas pressure data at a plurality of detection time points, a frequency and occurrence probability of noise;

determine, based on the frequency and occurrence probability of the noise, a noise distribution situation by a preset mode, the noise distribution situation including a frequency distribution and a probability distribution; and adjust, based on the noise distribution situation, the gas metering strategy.

12. The IoT system of claim 11, wherein the smart gas device management platform is further configured to:

determine, based on the gas flow data and the gas pressure data at the plurality of detection time points, the frequency and occurrence probability of the noise by a noise determination model, the noise determination model being a machine learning model.

13. The IoT system of claim 12, wherein an input of the noise determination model further includes at least one of environmental data of the gas ultrasonic meter, a duration of use of the gas ultrasonic meter, and a flow loss of a gas pipeline.

14. The IoT system of claim 11, wherein the noise distribution situation includes a first noise distribution situation, and the smart gas device management platform is further configured to:

obtain, based on the frequency and occurrence probability of the noise, a noise distribution sequence, and determine a first support threshold;

determine, based on the noise distribution sequence and the first support threshold, a first target item; and determine, based on the first target item, the first noise distribution situation.

15. The IoT system of claim 14, wherein the noise distribution situation further includes a second noise distribution situation, and the smart gas device management platform is further configured to:

determine, based on the noise distribution sequence, at least one noise distribution subsequence, and determine a second support threshold;

determine, based on the noise distribution subsequence and the second support threshold, a second target item; and determine, based on the second target item, the second noise distribution situation.

16. The IoT system of claim 15, wherein the noise distribution situation further includes a third noise distribution situation, and the smart gas device management platform is further configured to:

determine, based on the first target item and the second target item, a third target item; and determine, based on the third target item, the third noise distribution situation.

17. The IoT system of claim 16, wherein the smart gas device management platform is further configured to:

adjust, based on at least one of the first noise distribution situation, the second noise distribution situation, and the third noise distribution situation, the gas metering strategy.

* * * * *